March 15, 1927.
F. I. RAYMOND
STUFFING BOX
Filed April 24, 1925
1,621,272
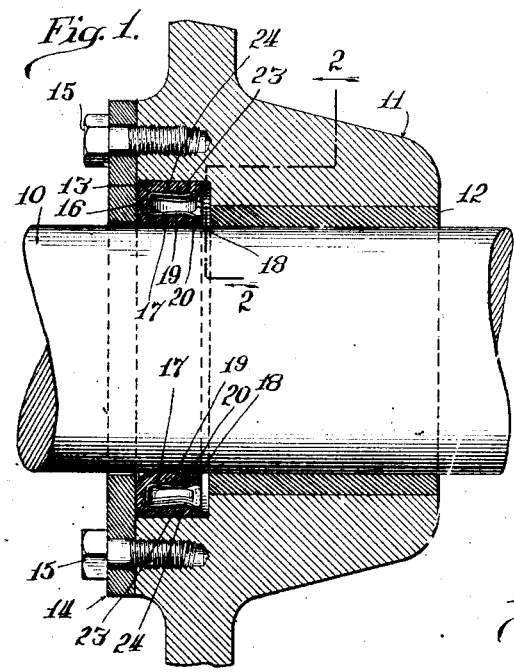
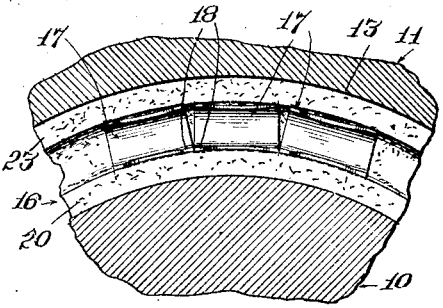
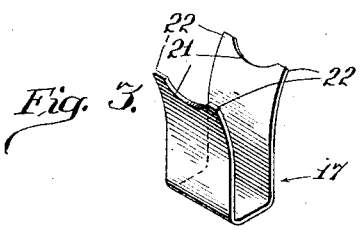
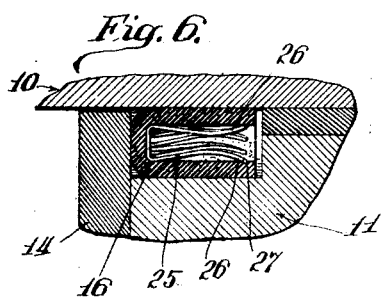
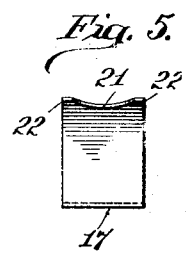
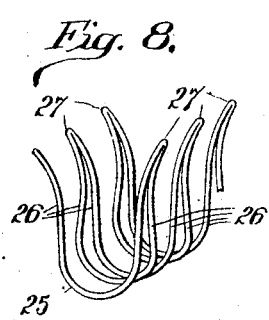
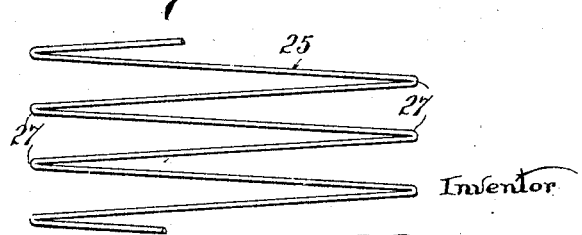
Inventor
Fred I. Raymond
By Barnett & Truman
Attorneys Patented Mar. 15, 1927.

1,621,272

UNITED STATES PATENT OFFICE.

FRED I. RAYMOND, OF RIVER FOREST, ILLINOIS, ASSIGNOR TO THE RAYMOND BROTHERS IMPACT PULVERIZER COMPANY, OF CHICAGO, ILLINOIS, A CORPORATION OF ILLINOIS.

STUFFING BOX.

Application filed April 24, 1925. Serial No. 25,563.

My invention relates to a packing or stuffing box for revolving or reciprocating shafts, journals, rods, and the like, the term "shaft" being used herein to designate this class of machine elements generally; and the object of the invention is to provide a novel device for effectively retaining a lubricant within and excluding dirt or foreign matter from the bearing of such shaft; or for providing, for other purposes, a reliable and durable packing for the joint between two such relatively movable machine elements, one of which is contained within or extends through the other. While usable in other connections, the invention is intended more especially for rotating shafts and in this situation an object of the invention is to provide a packing which will effect and will not be injured in cases where there is some side play in the shaft.

The invention is illustrated, in certain preferred embodiments, in the accompanying drawing, wherein Fig. 1 is a longitudinal sectional view of a rotating shaft and its housing provided with a preferred form of packing in accordance with my invention.

Fig. 2 is a fragmentary cross sectional view on line 2—2 of Fig. 1.

Fig. 3 is a view, in perspective, of one of the spring members for expanding the packing member.

Fig. 4 is a sectional view of the spring member.

Fig. 5 is a side elevation of the same.

Fig. 6 is a fragmentary sectional view illustrating a modification.

Fig. 7 is a fragmentary plan view of the elastic structure, at one stage of its manufacture, used for expanding the packing member in the modified form of packing shown in Fig. 6, and Fig. 8 is a fragmentary view of this structure in its finished form but before being inserted into the packing member.

Referring first to Figs. 1, 2, 3, 4 and 5 of the drawing, 10 designates a shaft and 11 a housing for the shaft which is shown as provided with a bushing 12.

The packing is located in a recess 13 of the housing and is retained in place by any suitable means for example, by an annular plate 14 secured to the housing by screws 15.

The packing comprises an annular, flexible packing member 16 made of leather, or other suitable material, preferably channel-shaped in cross section and preferably in the form of an endless ring, although this is not essential, together with a plurality of U-shaped metallic retaining members 17 arranged within member 16. The members 17 are preferably composed of sheet metal bent to the form shown in Figs. 3, 4 and 5. They are forced into the channel of the packing member 16, being thereby bent into the shape indicated in Fig. 1. The members 17 are preferably arranged one close to the other as indicated in Fig. 2. These retaining members need not be, and preferably are not curved to correspond to the circumferential curvature of the shaft but their width—the dimension measured circumferentially of the shaft—is sufficiently small so that they will fit into the groove or channel in the packing member. They serve to hold the packing member in close contact with the shaft 10 and to prevent said member, which if made of leather or the like, will become much softened by the lubricant, from creeping with the shaft. To consider a single retaining member, the upper edge 18 of the leg 19 of the device which bears on the inner fold 20 of the packing member is recessed or cut to a curved configuration as shown at 21, this curvature being preferably such that the edge in question has a line contact with the packing member as shown in Fig. 2. The curve 21 does not, however, extend quite to the corners so that points or prongs 22 are provided which embed themselves in the packing member which will yield to these points enough to permit the line contact of edge 21 above referred to. The other leg of the retaining member might be cut reversely to give a line contact with the outer fold 23 of the packing member but this does not seem to be necessary; and as a matter of convenience, the edges of both legs are preferably alike so that the retaining device is reversible. This means that the outer legs 24 bear against the packing member only at their corners taking perhaps a better anchoring hold on the packing member than would be the case if their upper edges were cut on a reverse curve or were straight. The advantage of the line engagement of the inner legs with the inner fold of the packing member is that the packing member is held in more intimate contact with the shaft and is not allowed to wrinkle or gap, whereby the escape of lubricant between shaft and packing is better prevented. Each retaining device acts by itself in a sense. It is self adjusting to the situation in which it is placed and yields to any stress put upon it such as increased load upon or deformation or side play of the shaft. This unitary operation and the capacity of the device to yield minimize the danger of breakage of the retaining devices under unusual stresses or in case, through wear on bushing 12 looseness and side play of the shaft is developed. Any canting or rotary tendency on the part of the retaining member resulting from the rotation of the shaft is self checked due to increased pressure as between diagonally disposed corners.

In Figs. 6, 7 and 8 I have shown, in this case in connection with a channel-shaped packing member, a different form of expansion retaining means consisting of a continuous wire 25 bent to the form shown fragmentarily, in perspective, in Fig. 8. That is, the wire is bent so as to provide two oppositely disposed sets of spring fingers 26 forming together a general channel-shaped structure which can be bent circularly and forced into the channel of the packing member 16. These fingers are pointed at their ends, as indicated at 27 and, to a certain extent, tend to bite into the packing member, the structure being sprung or forced into its operative position. In forming the retaining device shown in Figs. 6 and 8 the wire is first bent in zigzag fashion, as indicated in Fig. 7. This structure is then bent to its channel or U form. The modification of Figs. 6 and 8 I regard as less advantageous than the construction of the preceding figures. It, nevertheless, has some of the desirable features of the preferred form first described.

The invention is susceptible of other modifications and it is my intention to cover by patent all modifications of the invention within the scope of the appended claims.

I claim:

1. In a shaft packing, the combination of a flexible packing member surrounding the shaft, a plurality of elastic, substantially U-shaped retaining members circumferentially arranged, without connection one with the other, against the packing member to keep the same in proper relation with the shaft.

2. In a shaft packing, the combination of a channelled, flexible packing member surrounding the shaft, and a plurality of separate, independently operating, substantially U-shaped retaining members circumferentially arranged without connection one with another within the channel of the packing member to keep the same in proper relation with the shaft.

3. In a shaft packing, the combination of a flexible packing member surrounding the shaft, and means comprising a plurality of separate, independently operating, circumferentially arranged spring fingers, the ends of which are formed with points adapted to bite into the packing member.

4. In a shaft packing, the combination of a flexible packing member channel-shaped in cross section, and a plurality of adjacently arranged U-shaped sheet metal spring members arranged in the channel of said packing member each spring member comprising opposite inwardly bowed arms adapted to bear at their ends on opposite inner sides of the packing member.

5. A packing comprising, in combination, an annular, flexible packing member channel-shaped in cross section, and separate, independently operating, disconnected, compressible members within the channel of said member for expanding the packing member against the machine elements between which the packing is located.

6. A packing comprising, in combination, a flexible packing member channel-shaped in cross section, and means within the channel of said member for expanding the member against the machine elements between which the packing is located comprising a plurality of reversible substantially U-shaped sheet metal spring members, the end edges of which are curved inwardly.

7. A packing comprising, in combination, an annular, flexible packing member channel-shaped in cross section, and a plurality of spaced, sheet metal spring members bent to substantially U-shape without connection with each other and adapted to be separately sprung into the channel of said packing member.

8. A shaft packing comprising a flexible packing member, and a plurality of separate, reversible, substantially U-shaped spring retaining members having legs to engage the portion of the packing member bearing on said shaft, the end edges of which legs are curved inwardly.

9. A shaft packing comprising a flexible channeled packing member and a plurality of substantially U-shaped retaining members formed from flat spring metal, the end edges of which are curved inwardly between the corners to provide a prong at each corner.

10. A shaft packing comprising a flexible packing member, and a plurality of substantially U-shaped retaining members formed from flat spring material and having legs to engage the portion of the packing member bearing on said shaft, the end edges of which legs are curved between the corners to provide a prong at each corner.

11. In a shaft packing, the combination of a flexible packing member channel-shaped in cross section surrounding said shaft, and a plurality of substantially U-shaped retaining devices within the channel of said member comprising side arms which are inwardly bowed toward one another and adapted to bear on their ends at opposite inner sides of the packing member, the ends being curved to bear with line contact against one flange of the channeled packing.

12. In a shaft packing, the combination of a flexible packing member channel-shaped in cross section, and a plurality of adjacently arranged U-shaped sheet metal spring members arranged in the channel of said packing member, each member being formed from a flat strip bent into a U-shape with the outer leg of the member forming a chord of the larger inner circumference of the channel, and the inner leg being substantially tangent to the smaller circumference of the channel, the end of the inner leg being inwardly curved to permit of a line contact with the inner surface of this flange of the channeled packing member.

FRED I. RAYMOND.